(12) United States Patent
Bushmire

(10) Patent No.: US 10,889,370 B2
(45) Date of Patent: Jan. 12, 2021

(54) CHORD-WISE VARIABLE VORTEX GENERATOR

(71) Applicant: Bell Helicopter Textron Inc., Fort Worth, TX (US)

(72) Inventor: Troy Thomas Bushmire, Saginaw, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 297 days.

(21) Appl. No.: 16/025,041

(22) Filed: Jul. 2, 2018

(65) Prior Publication Data

US 2020/0001973 A1 Jan. 2, 2020

(51) Int. Cl.
| | |
|---|---|
| *B64C 23/06* | (2006.01) |
| *F16D 1/00* | (2006.01) |
| *B64C 3/42* | (2006.01) |
| *B64C 27/22* | (2006.01) |
| *B64C 29/00* | (2006.01) |
| *F15D 1/00* | (2006.01) |

(52) U.S. Cl.
CPC ............... *B64C 23/06* (2013.01); *B64C 3/42* (2013.01); *B64C 27/22* (2013.01); *B64C 29/0033* (2013.01); *F15D 1/007* (2013.01); *B64C 2230/00* (2013.01)

(58) Field of Classification Search
CPC .. B64C 3/36; B64C 3/58; B64C 23/06; F15D 1/007; F15D 1/006
See application file for complete search history.

(56) References Cited

U.S. PATENT DOCUMENTS

| | | | |
|---|---|---|---|
| 5,253,828 A | 10/1993 | Cox | |
| 5,755,408 A * | 5/1998 | Schmidt | B64C 21/00 244/130 |
| 6,105,904 A * | 8/2000 | Lisy | B64C 23/06 244/200.1 |
| 6,283,406 B1 * | 9/2001 | Remington | B64C 23/06 244/1 N |
| 6,655,311 B1 * | 12/2003 | Martin | F15D 1/12 114/242 |
| 7,748,958 B2 * | 7/2010 | McVeigh | B64C 23/06 415/119 |
| 7,878,457 B2 * | 2/2011 | Narramore | B64C 23/06 244/200.1 |
| 8,616,494 B2 | 12/2013 | Neitzke et al. | |

(Continued)

*Primary Examiner* — Brian M O'Hara
(74) *Attorney, Agent, or Firm* — Patent Capital Group

(57) ABSTRACT

One embodiment is an apparatus including an airfoil-shaped body; and a chordwise variable vortex generation system associated with the airfoil-shaped body, the chordwise variable vortex generation system controlling a deployment of at least one vortex generator on a surface of the airfoil-shaped body, wherein the deployment of the at least one vortex generator is dependent on a current angle of attack of the airfoil-shaped body. In some embodiments, the chordwise variable vortex generation system includes an actuator for controlling a location of the deployment of the at least one vortex generator responsive to a control signal indicative of the current angle of attack of the airfoil-shaped body. In certain embodiments, the surface of the airfoil-shaped body is a top surface of the airfoil-shaped body. In some embodiments, the airfoil-shaped body is an aircraft wing.

18 Claims, 8 Drawing Sheets

(56) References Cited

U.S. PATENT DOCUMENTS

| | | | |
|---|---|---|---|
| 8,657,238 B2 | 2/2014 | Fox et al. | |
| 8,746,053 B2 | 6/2014 | Brake et al. | |
| 9,422,954 B2 * | 8/2016 | Van Buren | B64C 23/005 |
| 9,464,532 B2 * | 10/2016 | Sutton | B64C 27/72 |
| 9,488,064 B2 | 11/2016 | Perrot et al. | |
| 9,650,124 B2 | 5/2017 | Neitzke et al. | |

* cited by examiner

CHORD-WISE VARIABLE VORTEX GENERATOR

TECHNICAL FIELD

This disclosure relates generally to aircraft devices and, more particularly, to chord-wise variable vortex generators for airfoil-shaped surfaces of such aircraft devices.

BACKGROUND

Vortex generators have been used with a variety of aerodynamic surfaces to mix high momentum fluid flow outside a boundary layer into the low momentum flow inside the boundary layer. The use of such vortex generators in a variety of aircraft have produced improvements in maximum lift capability, drag in high lift conditions, as well as maneuver effectiveness. However, permanently installed vortex generators produce drag penalties and may accrete foreign matter such as ice shapes that significantly degrade the proper performance of the aircraft. Additionally, for the application on aircraft with very thick wings, permanently installed vortex generators on wings are typically positioned closer to the leading edge of the wing to reenergize flow and keep the flow attached to the wing at higher angles of attack, thereby increasing the maximum coefficient of lift, or "CLmax," of the wing. At low angles of attack, however, such positioning of vortex generators creates unnecessary forced turbulent flow, which increases skin friction; additionally, the forced transition is further forward than optimal, such that the airfoil-shaped body comprising the wing does not perform as well as it would if the vortex generator was positioned further back from the leading edge of the wing.

SUMMARY

One embodiment is an apparatus including an airfoil-shaped body; and a chordwise variable vortex generation system associated with the airfoil-shaped body, the chordwise variable vortex generation system controlling a deployment of at least one vortex generator on a surface of the airfoil-shaped body, wherein the deployment of the at least one vortex generator is dependent on a current angle of attack of the airfoil-shaped body. In some embodiments, the chordwise variable vortex generation system includes an actuator for controlling a location of the deployment of the at least one vortex generator responsive to a control signal indicative of the current angle of attack of the airfoil-shaped body. In certain embodiments, the surface of the airfoil-shaped body is a top surface of the airfoil-shaped body. In some embodiments, the airfoil-shaped body is an aircraft wing.

The chordwise variable vortex generation system may include a track disposed along the surface of the airfoil-shaped body between a leading edge of the airfoil-shaped body and a trailing edge of the airfoil-shaped body. The at least one vortex generator may be moveable within the track from a first end of the track proximate the leading edge of the airfoil-shaped body to a second end of the track proximate the trailing edge of the airfoil-shaped body, and a position of the at least one vortex generator along the track may be dependent on the current angle of attack of the airfoil-shaped body. In certain embodiments, as the angle of attack of the airfoil-shaped body increases, the at least one vortex generator is moved closer to the leading edge of the airfoil-shaped body and as the angle of attack of the airfoil-shaped body decreases, the at least one vortex generator is moved closer to the trailing edge of the airfoil-shaped body.

The chordwise variable vortex generation system may alternatively include a set of vortex generators disposed in a line along the surface of the airfoil-shaped body between a leading edge of the airfoil-shaped body and a trailing edge of the airfoil-shaped body, wherein at any given time, only one vortex generator of the set of vortex generators comprises an active vortex generator and the remaining vortex generators of the set of the vortex generators each comprise an inactive vortex generator. In certain embodiments, the active vortex generator extends from the surface of the airfoil-shaped body and each inactive vortex generator lies flush with the surface of the airfoil-shaped body or is retracted within the interior or the airfoil-shaped body. As the angle of attack of the airfoil-shaped body increases, a vortex generator of the set of vortex generators closer to the leading edge of the airfoil-shaped body may be implemented as the active airfoil-shaped body and as the angle of attack of the airfoil-shaped body decreases, a vortex generator of the set of vortex generators closer to the trailing edge of the airfoil-shaped body may be implemented as the active airfoil-shaped body.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
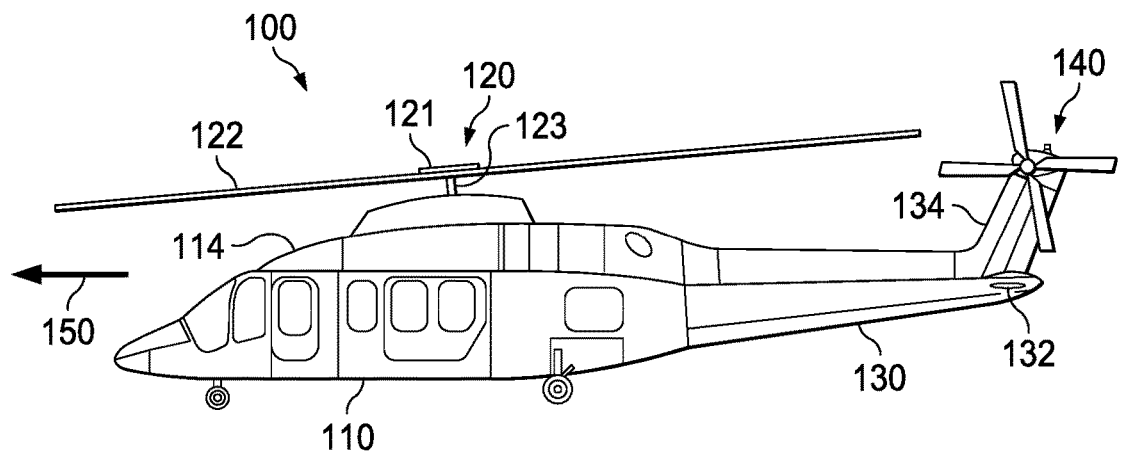
FIGS. 1A-1B and 2 illustrate example aircraft in accordance with certain embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
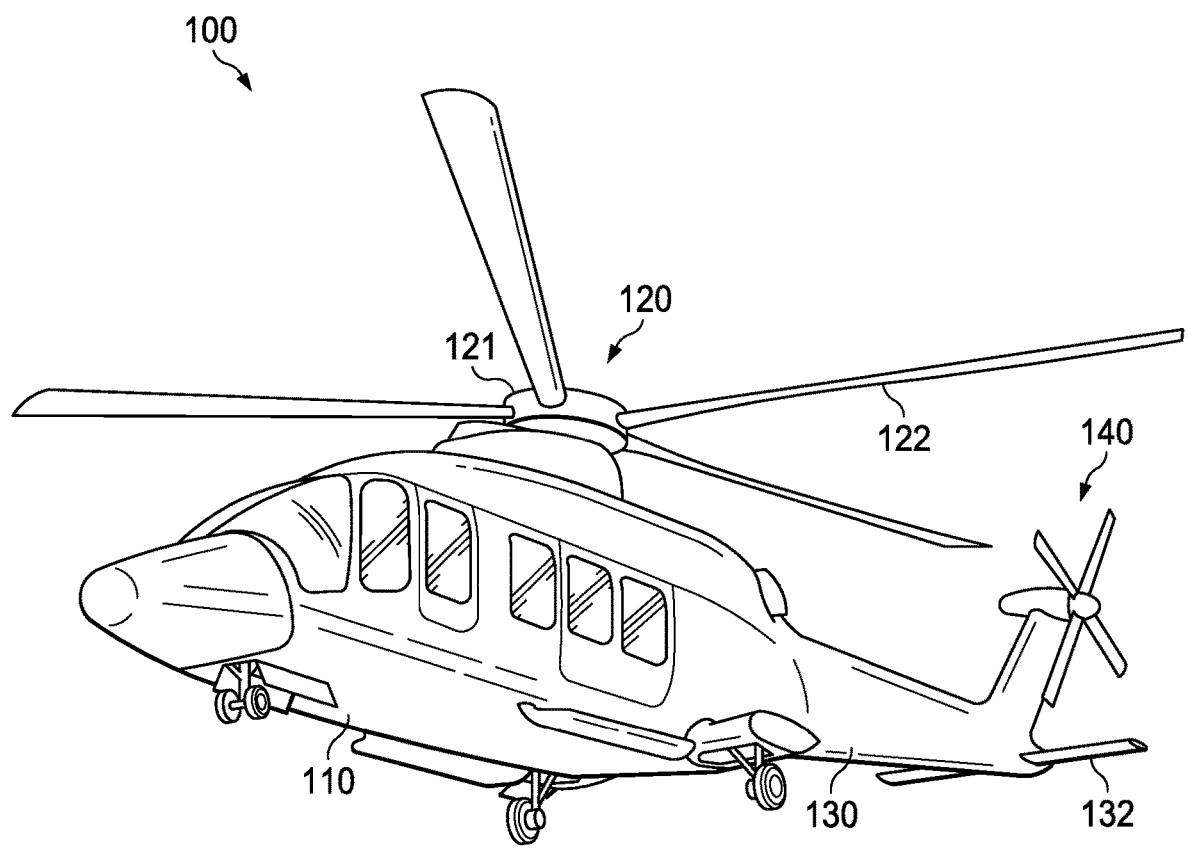

Referring to FIGS. 1A-1B, FIGS. 1A-1B illustrate an example embodiment of an aircraft, which in this example is a rotorcraft 100. FIG. 1A portrays a side view of rotorcraft 100, while FIG. 1B portrays an isometric view of rotorcraft 100. Rotorcraft 100 includes a fuselage 110, a rotor system 120, an empennage 130, and a tail rotor or anti-torque system 140. The fuselage 110 is the main body of the rotorcraft 100, which may include a cabin (e.g., for crew, passengers, and/or cargo) and/or may house certain mechanical components, electrical components, etc. (e.g., engine(s), transmission, flight controls, etc.). The rotor system 120 is used to generate lift for rotorcraft 100. For example, the rotor system 120 (also generally referred to as the "rotor") may include a rotor hub 121 (also referred to as the "rotor hub assembly" or more generally as a "hub") coupled to a plurality of rotor blades 122 (also referred to generally as "blades"). Torque generated by the engine(s) of the rotorcraft causes the rotor blades 122 to rotate, which generates lift. The rotor system 120 is supported by a mast 123. The empennage 130 of the rotorcraft 100 includes a horizontal stabilizer 132, vertical stabilizer 134, and tail rotor or anti-torque system 140. The horizontal stabilizer 132 and vertical stabilizer 134 respectively provide horizontal and vertical stability for the rotorcraft 100. Moreover, tail rotor or anti-torque system 140 may be used to provide anti-torque and/or direction control for the rotorcraft 100.

Figure 2:
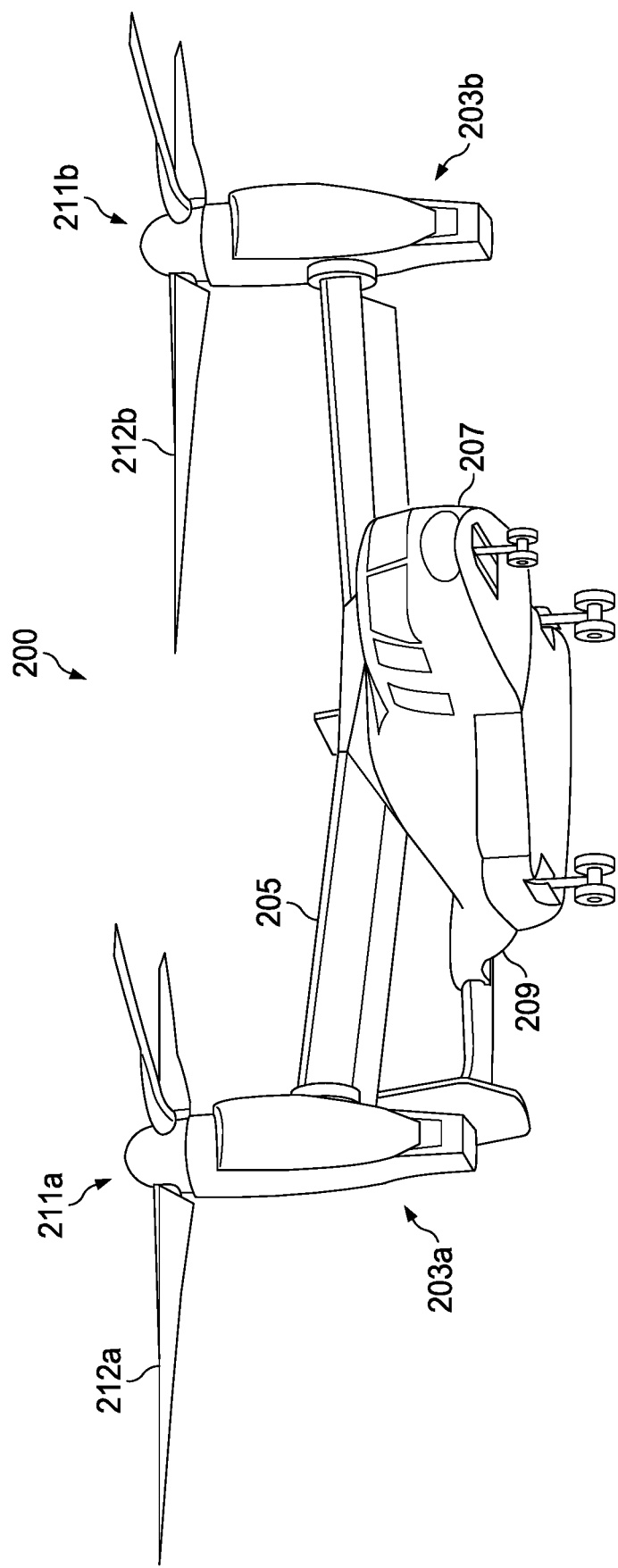

Referring to FIG. 2, FIG. 2 illustrates a perspective view of an example aircraft, which in this example is a tiltrotor aircraft 200. Tiltrotor aircraft 200 includes nacelles 203a and 203b, a wing 205, a fuselage 207, and a tail member 209. Nacelles 203a and 203b respectively include rotor systems 211a and 211b, and each rotor system includes a plurality of rotor blades 212a and 212b, respectively. Moreover, each nacelle 203a and 203b may include engine(s) and gearbox(es) for driving each rotor system 211a and 211b, respectively. In some embodiments, nacelles 203a and 203b may each be configured to rotate between a helicopter mode, in which the nacelles 203a and 203b are approximately vertical (as shown in FIG. 2), and an airplane mode, in which the nacelles 203a and 203b are approximately horizontal. In the illustrated embodiment, the tail member 209 may be used as a vertical stabilizer.

Aircraft such as rotorcraft 100 and tiltrotor aircraft 200 rely on rotor systems (e.g., rotor system 120 and tail rotor or anti-torque system 140 of rotorcraft 100) for flight capabilities, such as controlling (e.g., managing and/or adjusting) flight direction, thrust, and lift of the aircraft. Consider various examples involving rotorcraft 100, which can also be applicable to tiltrotor aircraft 200 in various embodiments. For rotorcraft 100, the pitch of each rotor blade 122 can be controlled using collective control or cyclic control to selectively control direction, thrust, and lift of the rotorcraft 100.

During collective control, all the of rotor blades 122 are collectively pitched together (e.g., the pitch angle is the same for all blades), which effects overall thrust and lift. During cyclic control, the pitch angle of each of the rotor blades 122 varies depending on where each blade is within a cycle of rotation (e.g., at some points in the rotation the pitch angle is not the same for all blades), which can affect direction of travel of the rotorcraft 100.

Aircraft such as rotorcraft 100 of FIGS. 1A-1B and tiltrotor aircraft 200 of FIG. 2 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100 of the embodiment of FIG. 1A, the most aft blade (e.g., nearest to tail rotor or anti-torque system 140) of the rotor system 120 may be pitched more nose-up and the most forward blade may be pitched more nose-down; to provide a forward direction of travel (as generally indicated by arrow 150) for rotorcraft 100.

Several types of aircraft incorporate pylons into their primary wing structure. For example, an airplane wing may incorporate a fixed pylon that includes a jet engine or propeller. In tiltrotor aircraft, pylons are typically mounted at or near the outboard ends of the wing. Each pylon, which includes a proprotor, is rotatable relative to the wing such that the proprotor blades have a generally horizontal plane of rotation providing vertical lift for takeoff, hovering and landing, much like a conventional helicopter, and a generally vertical plane of rotation providing forward thrust for cruising in forward flight with the wing providing lift, much like a conventional propeller driven airplane. In addition, tiltrotor aircraft can be operated in configurations between the helicopter flight mode and the airplane flight mode, which may be referred to as conversion flight mode. A drive system, including an engine or motor, provides rotational energy to the proprotors, and may be located in the fuselage, pylons and/or wing of the tiltrotor aircraft.

Pylons mounted on the outboard ends of a wing can limit the wingspan of the aircraft. Wing extensions may be mounted outboard of the pylons to increase the wingspan and aspect ratio of the aircraft. Wing extensions increase the efficiency of aircraft in flight, including the capability to fly at a higher altitude for longer ranges with the same fuel load.

Figure 3A:
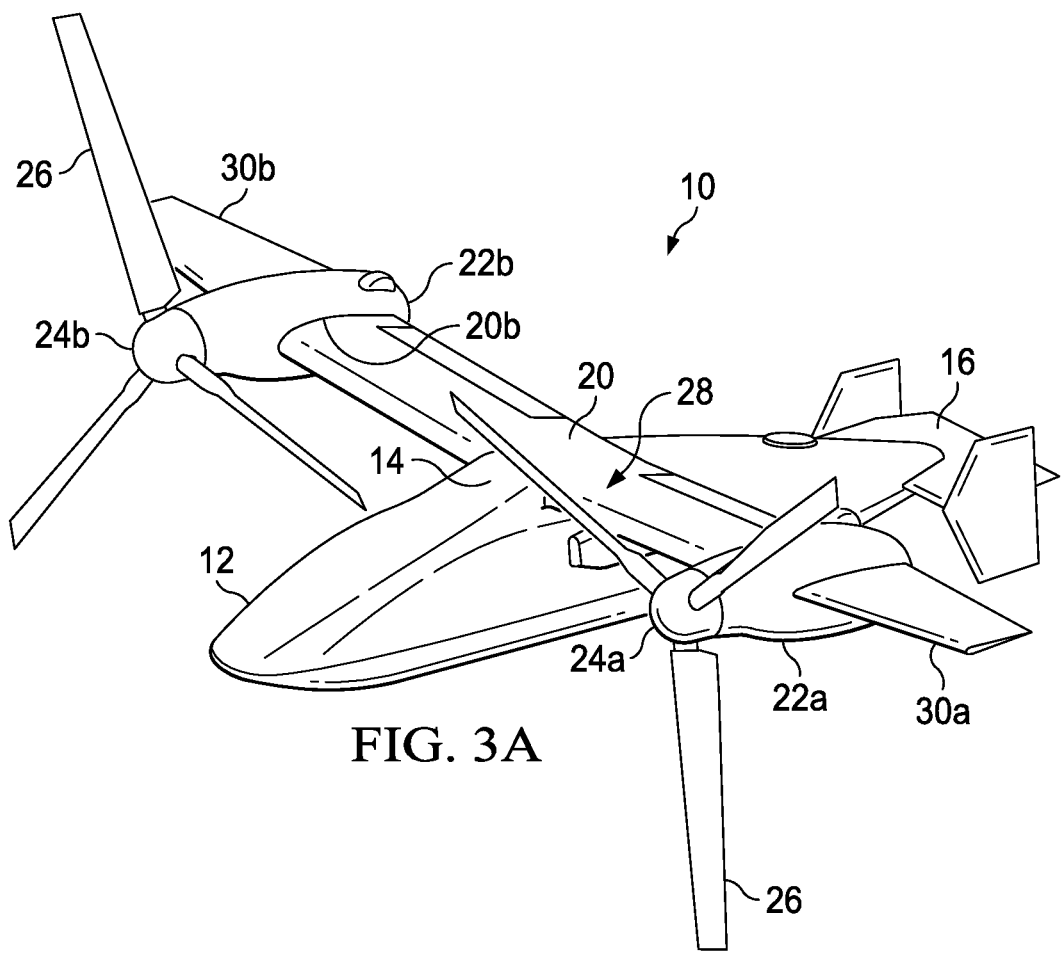
FIGS. 3A-3B are schematic illustrations of a tiltrotor aircraft having wing extensions in accordance with certain embodiments of the present disclosure.
Figure 3B:
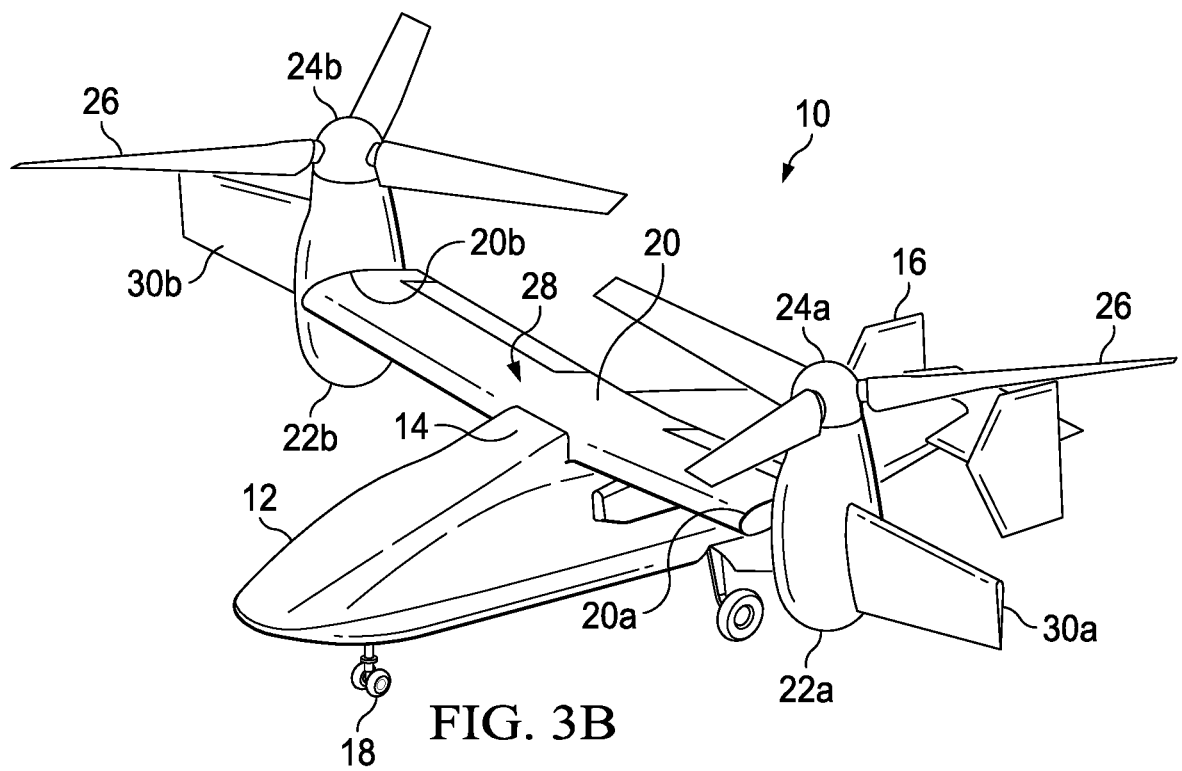

Referring now to FIGS. 3A and 3B, illustrated therein is a tiltrotor aircraft 301. The tiltrotor 301 includes a fuselage 312, a wing mount assembly 314 and a tail assembly 316. Tail assembly 316 may have control surfaces operable for horizontal and/or vertical stabilization during flight. A landing gear system 318 provides ground support for tiltrotor aircraft 301. A wing 320 is supported by fuselage 312 and wing mount assembly 314.

Coupled to outboard ends 320a, 320b of wing 320 are pylon assemblies 322a, 322b. Pylon assembly 322a is rotatable relative to wing 320 between a generally horizontal orientation, as best viewed in FIG. 3A, and a generally vertical orientation, as best viewed in FIG. 3B. Pylon assembly 322a includes a rotatable portion of the drive system and a proprotor assembly 324a that is rotatable responsive to torque and rotational energy provided by an engine or motor of the drive system. Likewise, pylon assembly 322b is rotatable relative to wing 320 between a generally horizontal orientation, as best viewed in FIG. 3A, and a generally vertical orientation, as best viewed in FIG. 3B. Pylon assembly 322b includes a rotatable portion of the drive system and a proprotor assembly 324b that is rotatable responsive to torque and rotational energy provided by an engine or motor of the drive system. In the illustrated embodiment, proprotor assemblies 324a, 324b each include three proprotor blade assemblies 326. It should be understood by those having ordinary skill in the art, however, that proprotor assemblies 324a, 324b could alternatively have a different number of proprotor blade assemblies, either less than or greater than three. In addition, it should be understood that the position of pylon assemblies 322a, 322b, the angular velocity or revolutions per minute (RPM) of proprotor assemblies 324a, 324b, the pitch of proprotor blade assemblies 326 and the like may be controlled by the pilot of tiltrotor aircraft 301 and/or a flight control system to selectively control the direction, thrust and lift of tiltrotor aircraft 301 during flight.

FIG. 3A illustrates tiltrotor aircraft 301 in a forward flight mode or airplane flight mode, in which proprotor assemblies 324a, 324b are positioned to rotate in a substantially vertical plane and provide a forward thrust while a lifting force is supplied by wing 320 such that tiltrotor aircraft 301 flies much like a conventional propeller driven aircraft. FIG. 3B illustrates tiltrotor aircraft 301 in a vertical takeoff and landing (VTOL) flight mode or helicopter flight mode, in which proprotor assemblies 324a, 324b are positioned to rotate in a substantially horizontal plane and provide a vertical thrust such that tiltrotor aircraft 301 flies much like a conventional helicopter. During operation, tiltrotor aircraft 301 may convert from helicopter flight mode to airplane flight mode following vertical takeoff and/or hover. Likewise, tiltrotor aircraft 301 may convert back to helicopter flight mode from airplane flight mode for hover and/or vertical landing. In addition, tiltrotor aircraft 301 can perform certain flight maneuvers with proprotor assemblies 324a, 324b positioned between airplane flight mode and helicopter flight mode, which can be referred to as conversion flight mode.

Wing 320 and pylon assemblies 322a, 322b form part of a propulsion and lift system 328 for tiltrotor aircraft 301. Fuselage 312 may include a drive system, including an engine, motor and/or transmission, for providing torque and rotational energy to each proprotor assembly 324a, 324b via one or more drive shafts located in wing 320. In other embodiments, each pylon assembly 322a, 322b houses a drive system, such as an engine, motor and/or transmission, for supplying torque and rotational energy to a respective proprotor assembly 324a, 324b. In such embodiments, the drive systems of each pylon assembly 322a, 322b, may be coupled together via one or more drive shafts located in wing 320 such that either drive system can serve as a backup to the other drive system in the event of a failure. In tiltrotor aircraft having both pylon and fuselage mounted drive systems, the fuselage mounted drive system may serve as a backup drive system in the event of failure of either or both of the pylon mounted drive systems.

As will be readily recognized by one of ordinary skill in the art of aerodynamics, when moved through a fluid, an airfoil-shaped body, such as the wing of an aircraft, will produce an aerodynamic force. The component of this aerodynamic force parallel to the direction of motion is referred to as "drag," while the component of the force perpendicular to the direction of motion is referred to as "lift." Aircraft wings typically include a rounded leading edge and a sharp trailing edge and may have a symmetric or asymmetric curvature of their upper and lower surfaces. The lift on an airfoil-shaped body results primarily from its angle of attack and shape. In particular, at a suitable angle of attack, an airfoil-shaped body will deflect oncoming air, resulting in a force in a direction opposite the deflection.

A vortex generator is an aerodynamic device comprising a small vane that is typically attached to an aircraft wing.

When a wing having a vortex generator attached thereto is in motion relative to air, the vortex generator (as its name implies) crates a vortex which delays local flow separation and aerodynamic stalling by reenergizing the low momentum flow within the boundary layer by drawing in high momentum flow from outside the boundary layer. As a result, the effectiveness of the wings and control surfaces thereof (such as flaps, ailerons, rudders, and elevators, for example) may be improved. As previously noted, the primary purpose of vortex generators is to delay flow separation. In theory, they may be located near the thickets portion of the airfoil-shaped body; however, they are often installed close to the leading edge of the wing to maintain steady airflow over the control surfaces located at the trailing edge of the wings at high angles of attack, due to the fact that the location of transition from favorable to adverse pressure gradient moves forward with increasing angle of attack. Vortex generators are generally triangular or rectangular and are approximately as tall as the local boundary layer. Vortex generators may run in spanwise lines near the thickest part of the wing and are positioned obliquely so that they have an angle of attack relative to the local airflow so as to create a tip vortex, which draws energetic, rapidly moving outside air into the slow-moving, low momentum flow of the boundary layer in contact with the surface of the wing. It will be recognized that a turbulent boundary layer is less likely to separate than a laminar one, and is therefore desirable to ensure effectiveness of trailing-edge control surfaces; vortex generators may be used to trigger this transition.

Example embodiments associated with chord-wise variable vortex generators are described below with more particular reference to the remaining FIGURES. It should be appreciated that the rotorcraft 100 of FIGS. 1A-1B, tiltrotor aircraft 200 of FIG. 2, and tiltrotor aircraft 301 of FIGS. 3A-3B are merely illustrative of a variety of aircraft that can be used to implement embodiments of the present disclosure described and illustrated herein. Other aircraft implementations can include, for example, fixed wing airplanes, hybrid aircraft, unmanned aircraft, gyrocopters, a variety of helicopter configurations, and drones, among other examples. The FIGURES and the corresponding descriptions are applicable to any type of aircraft. Moreover, it should be appreciated that even though aircraft are particularly well suited to implement embodiments of the present disclosure, the described embodiments can also be implemented using non-aircraft vehicles and devices.

Embodiments described herein include a vortex generator the chord-wise location of which on a wing moves as a function of aircraft angle of attack. In certain embodiments, the chord-wise location of the vortex generator is set such that it is right at or slightly forward of the transition from favorable to adverse pressure gradient. At low angles of attack, the vortex generator is further aft; more laminar flow (i.e., less skin friction) is achieved by utilizing the favorable pressure gradient that would have otherwise been forced to turbulent flow by a vortex generator positioned closer to the leading edge of the wing. At high angles of attack, the vortex generator is positioned further forward (toward the leading edge of the wing), ensuring transition to increase CLmax, by its position closer to the leading edge of the wing. As a result, better performance is achieved at low angles of attack with out sacrificing performance at high angles of attack.

Figure 4A:
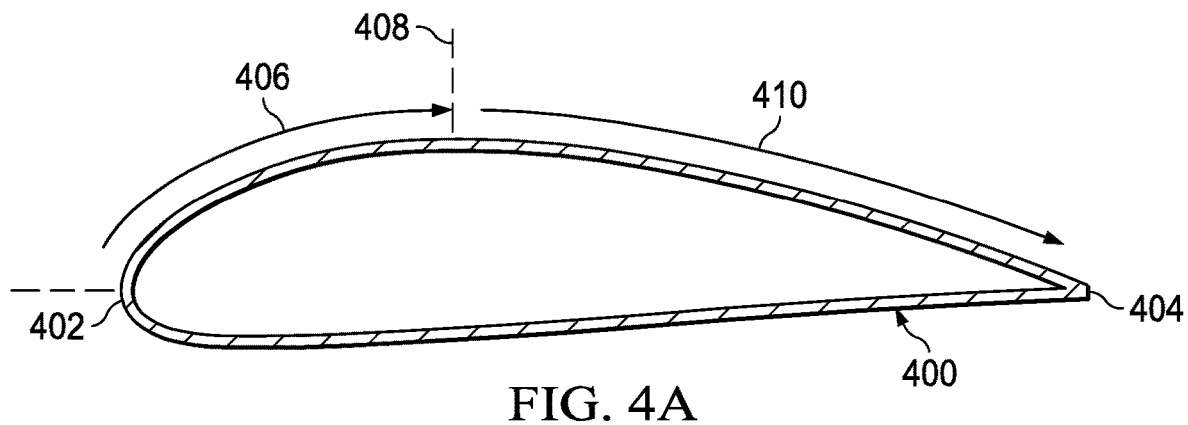
FIGS. 4A-4B are schematic illustrations of an airfoil-shaped body illustrating an effect of angle of attack of the airfoil-shaped body on relative pressure gradients on the surface of the airfoil-shaped body.
Figure 4B:
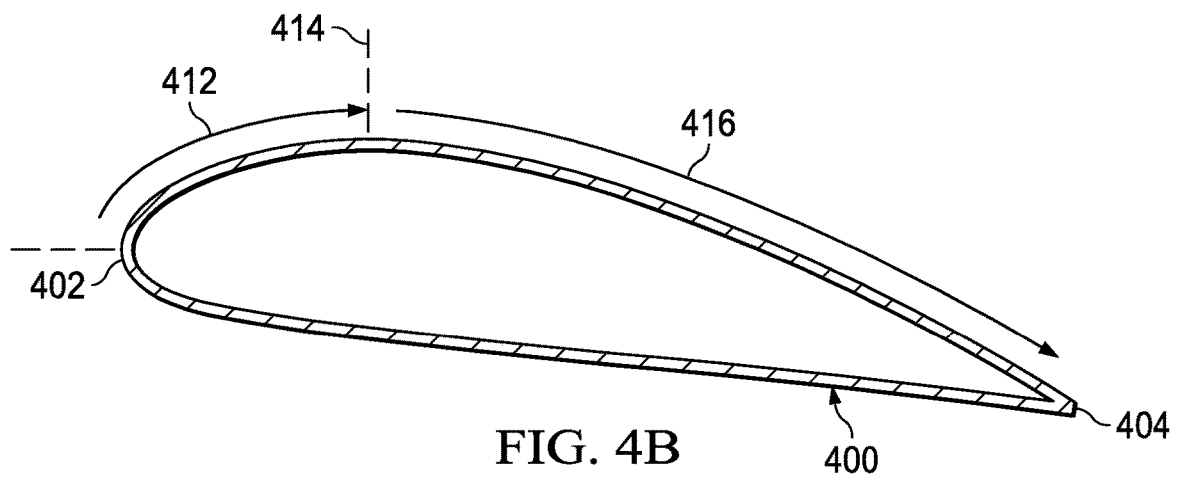

Referring now to FIGS. 4A and 4B, illustrated therein is a side cutaway view of an airfoil-shaped body 400, which in the illustrated embodiment is an aircraft wing. The airfoil-shaped body 400 has a leading edge 402 and a trailing edge 404. In the embodiment illustrated in FIG. 4A, the airfoil-shaped body 400 is positioned such that it has a low angle of attack. In this position, a favorable pressure gradient, represented by an arrow 406, exists to a point 408 over a portion of the leading edge 402 of the airfoil-shaped body 400. An adverse pressure gradient, represented by an arrow 410, exists from the point 408 over the trailing edge 404 of the airfoil-shaped body. In the embodiment illustrated in FIG. 4B, the airfoil-shaped body 400 is positioned such that it has a high angle of attack. In this position, a favorable pressure gradient, represented by an arrow 412, exists to a point 414 over a portion of the leading edge 402 of the airfoil-shaped body 400. An adverse pressure gradient, represented by an arrow 416, exists from the point 414 over the trailing edge 404 of the airfoil-shaped body. Comparing the embodiments illustrated in FIGS. 4A and 4B, when the airfoil-shaped body 400 is positioned such that it has a high angle of attack (FIG. 4B), the point 414 at which the pressure gradient transitions from favorable to adverse is further forward (chordwise) on the airfoil-shaped body than the transition point 408 for a low angle of attack (FIG. 4A). Optimally, a vortex generator could be positioned at the transition point, or boundary, between favorable to adverse pressure gradient regions of the airfoil-shaped body 400.

Figure 5A:
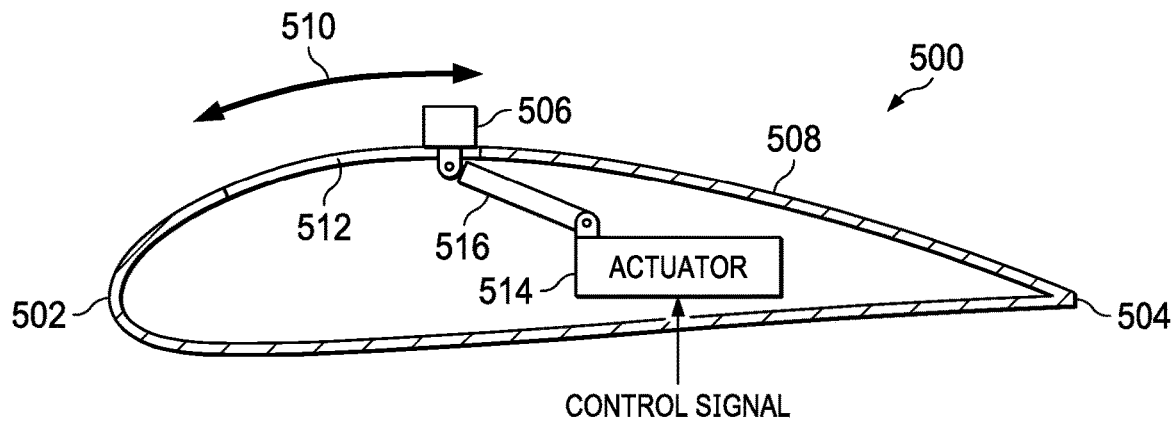
FIGS. 5A-5C are schematic illustrations of an airfoil-shaped body illustrating example details associated with a system for implementing variable chordwise vortex generators in accordance with certain embodiments.
Figure 5B:
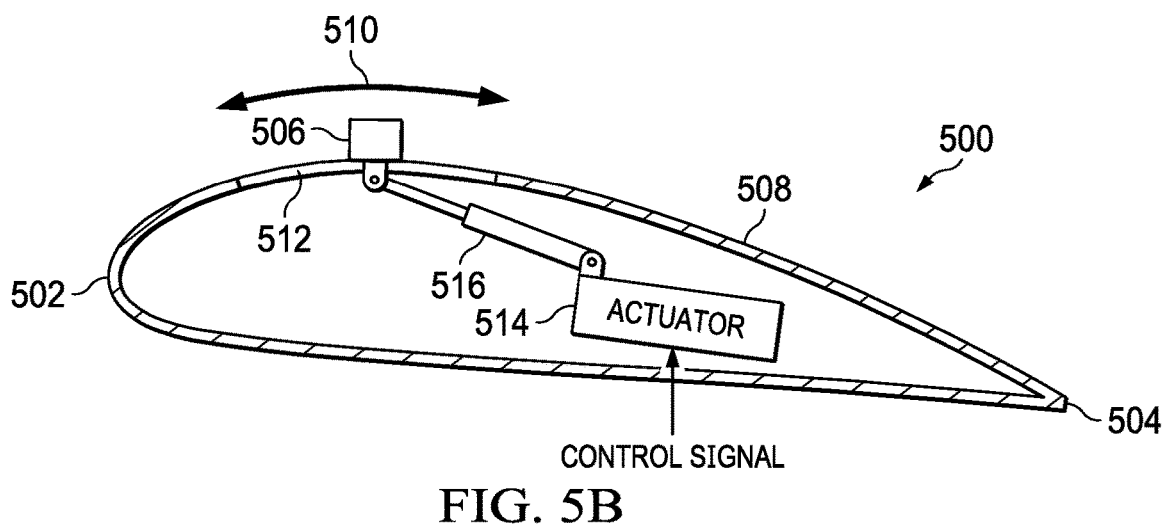
Figure 5C:
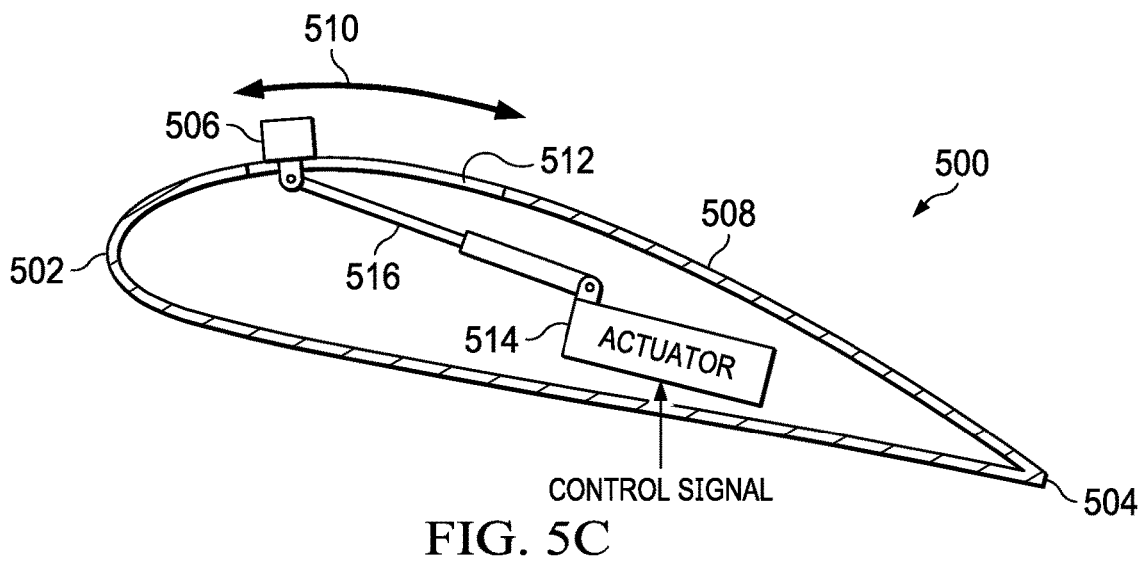

FIGS. 5A-5D illustrate a variable chordwise vortex generator mechanism in accordance with embodiments described herein. In particular, FIGS. 5A-5C illustrate a side cutaway view of an airfoil-shaped body 500, which in the illustrated embodiment is an aircraft wing. The airfoil-shaped body 500 has a leading edge 502 and a trailing edge 504. FIGS. 5A-5C illustrate the airfoil-shaped body 500 positioned at a low angle of attack (FIG. 5A), a mid angle of attack (FIG. 5B), and a high angle of attack (FIG. 5C), respectively. In accordance with features of embodiments described herein, a sliding vortex generator 506 is disposed on a top surface 508 of the airfoil-shaped body 500 and is designed to slide chordwise along the top surface 508 of the airfoil-shaped body 500 between a first position, as shown in FIG. 5A, corresponding to the boundary between favorable and adverse pressure gradient regions when the airfoil-shaped body 500 is at a lowest angle of attack, and a second position, as shown in FIG. 5C, corresponding to the boundary between favorable and adverse pressure gradient regions when the airfoil-shaped body is at a highest angle of attack, as represented by an arrow 510.

Figure 5D:
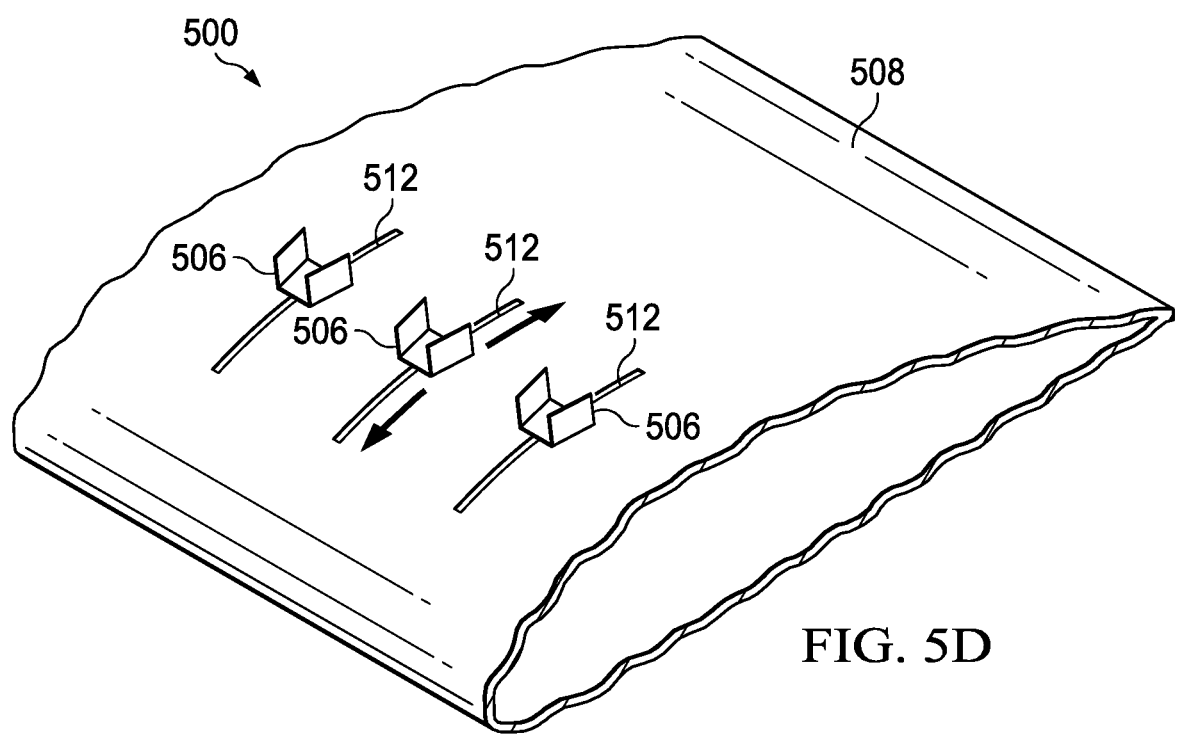
FIG. 5D illustrates a portion of a top surface of the airfoil-shaped body of FIGS. 5A-5C.

As best shown in FIG. 5D, in certain embodiments, the vortex generator 506 may be disposed in a track 512 provided in the top surface 508 of the airfoil-shaped body 500 between the first and second positions described above. An actuator 514 may be provided for adjusting the chordwise position of the vortex generator 506 relative to the surface 508 of the airfoil-shaped body 500 responsive to control signals from an aircraft control system, for example. The actuator 514 may include an arm member 516 connected to the vortex generator 506 through a slot running the length of the track 512 such that the actuator may slide the vortex generator to the desired location depending on the angle of attack as determined by the aircraft control system and communicated to the actuator via control signals.

Figure 6A:
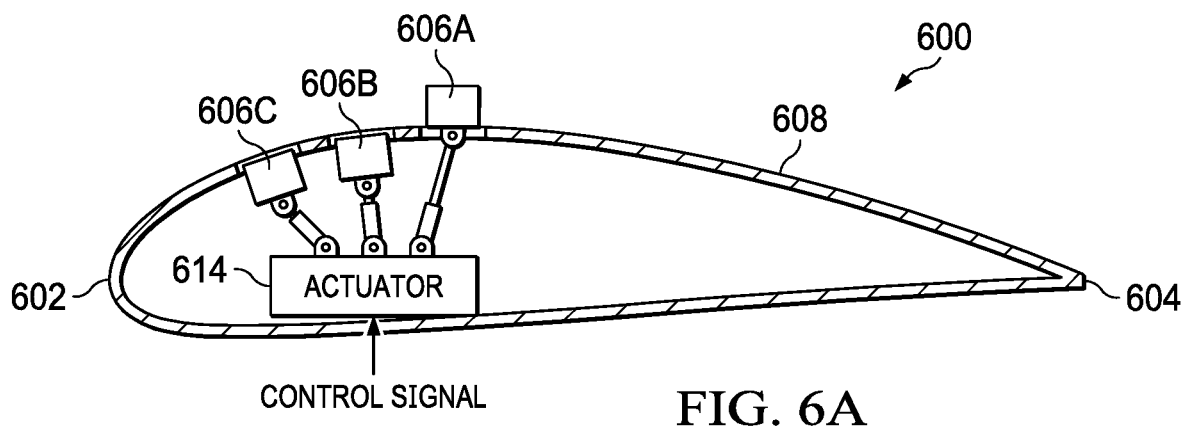
FIGS. 6A-6C are schematic illustrations of an airfoil-shaped body illustrating example details associated with a system for implementing variable chordwise vortex generators in accordance with certain alternative embodiments.
Figure 6B:
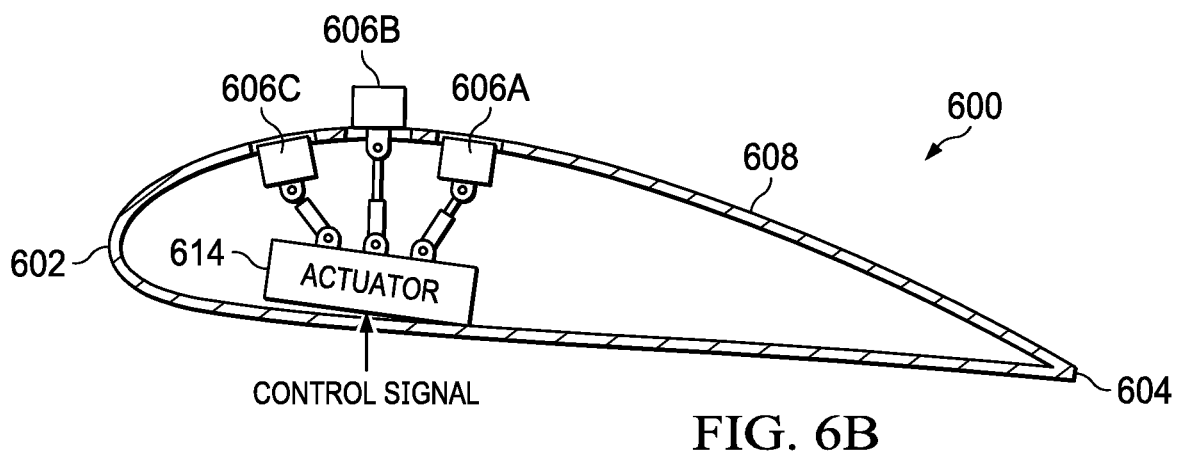
Figure 6C:
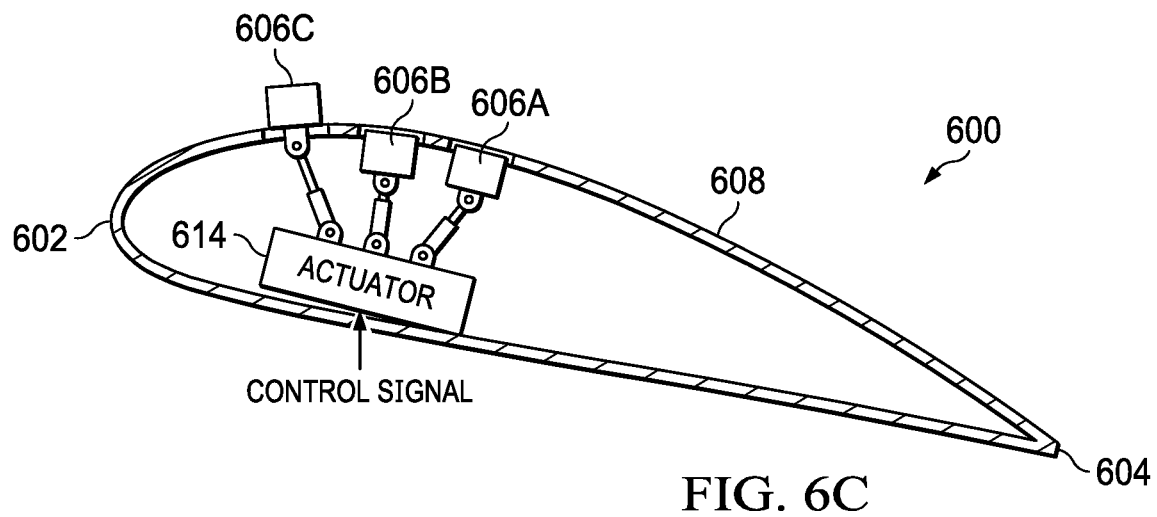

FIGS. 6A-6D illustrate an alternative embodiment of a variable chordwise vortex generator mechanism in accordance with embodiments described herein. In particular, FIGS. 6A-6C illustrate a side cutaway view of an airfoil-shaped body 600, which in the illustrated embodiment is an aircraft wing. The airfoil-shaped body 600 has a leading edge 602 and a trailing edge 604. FIGS. 6A-6C illustrate the airfoil-shaped body 600 positioned at a low angle of attack (FIG. 6A), a mid angle of attack (FIG. 6B), and a high angle of attack (FIG. 6C), respectively. In accordance with features of embodiments described herein, a number of discrete vortex generators, illustrated in FIGS. 6A-6C by vortex generators 606A-606C, are provided and are actuated by an actuator such that a selected one of the vortex generators is extended (e.g., vortex generator 606A in FIG. 6A) to a first ("active") position in which it is exposed on the exterior of the airfoil-shaped body 600 while the remaining vortex generators are retracted (e.g., vortex generators 606B and 606C in FIG. 6A) such that they are retained in a second ("inactive") position in which they lie flush with the surface of or are retracted to the interior to the airfoil-shaped body depending on the angle of attack of the airfoil-shaped body.

Figure 6D:
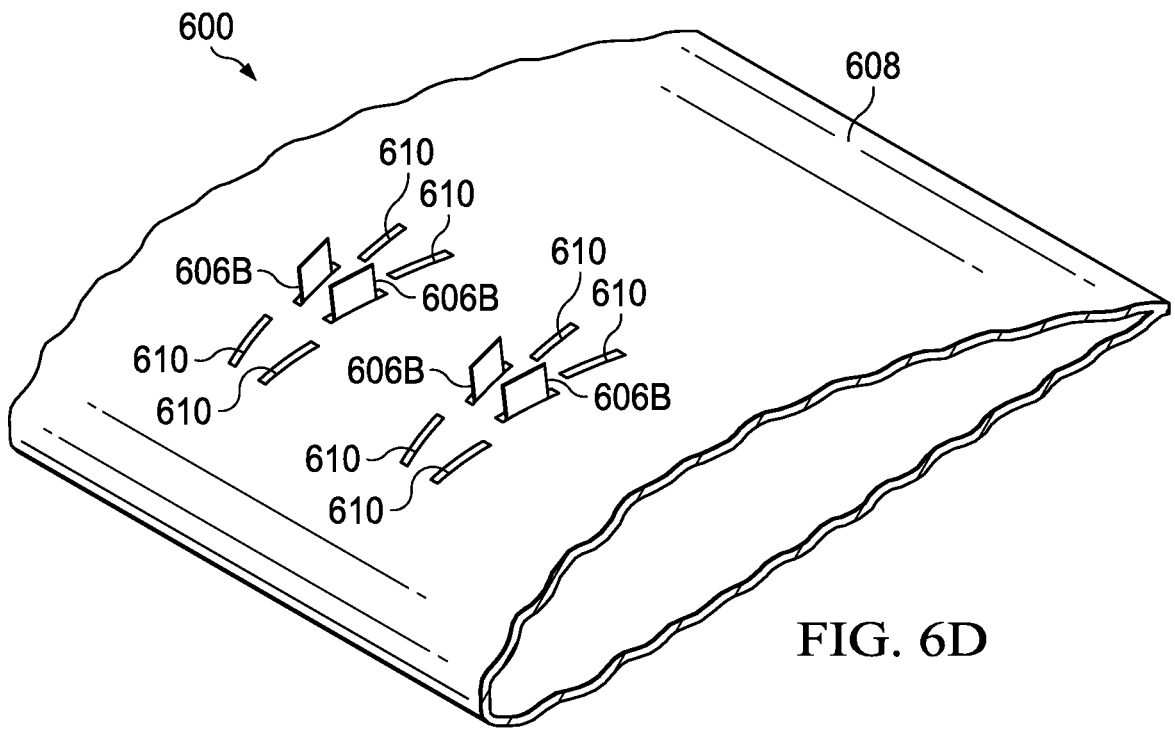
FIG. 6D illustrates a portion of a top surface of the airfoil-shaped body of FIGS. 6A-6C.

As best shown in FIG. 6D, in certain embodiments, the vortex generators 606A-606C may extended, or deployed, to a first position and retracted to a second position through appropriately-sized slots disposed in the top surface 608 of the airfoil-shaped body 600. An actuator 614 may be provided for controlling the positions (i.e., extended or retracted) of each of the vortex generators 606A-606C depending on the angle of attack as determined by the aircraft control system and communicated to the actuator via control signals. In alternative embodiments, instead of being retracted through slots into the interior of the airfoil-shaped body, the vortex generators 606A-606C may be retracted, or flipped, to a second position in which they lie flush with the surface of the airfoil-shaped body. It will be recognized that in certain embodiments, none of the vortex generators 606A-606C may be deployed, or extended, at a given time such that all of the vortex generators 606A-606C are in the second position (e.g., retracted or lying flush with the surface of the airfoil-shaped body).

Figure 7:
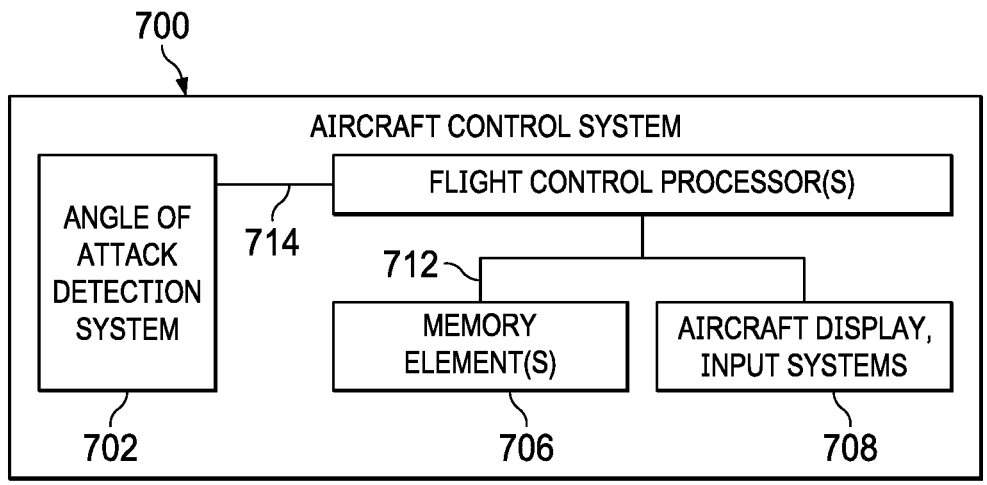
FIG. 7 is a simplified block diagram illustrating example details associated with a system for implementing variable chordwise vortex generators in accordance with certain embodiments.

Referring to FIG. 7, illustrated therein is a simplified block diagram of an example aircraft control system 700 for an aircraft in accordance with certain embodiments for implementing a system for monitoring various characteristics of a load-bearing rotating shaft. The aircraft control system 700 can include an angle of attack detection system ("AOADS") 702 for detecting angle of attack of an aircraft in which the aircraft control system 700 is deployed, at least one flight control processor 704, at least one at least one memory element 706, and aircraft display and input systems 708. At least one flight control processor 704 can be at least one hardware processor that uses software, firmware, combinations thereof, or the like to execute operations. At least one memory element 706 can store instructions that when executed cause the flight control processor(s) 704 to carry out operations. In various embodiments, aircraft display and input systems 708 can include displays that may provide user interfaces to allow a user, such as a pilot, to interact with the system 700. Such a user interface may include a display device such as a graphical display device (e.g., a plasma display panel (PDP), a liquid crystal display (LCD), a light emitting diode (LED) display, a cathode ray tube (CRT), etc.). In various embodiments, aircraft display and input systems 708 may also include any appropriate input mechanism such as a keyboard, a touch screen, a mouse, a trackball, voice recognition, touch pad, etc. In some embodiments, inputs for input systems can include pilot input generated using a manual control device, an electronic control device, or a combination thereof. In still some embodiments, inputs can be a remote signal received by the aircraft from a ground-based pilot/operator. Other inputs are also contemplated, including inputs from flight controllers, including a cyclic, a collective, and/or pedals. The aircraft control system 700 may be responsive to intended pilot inputs and/or other system inputs.

The system 700 may include one or more buses, such as a system bus and a memory bus, collectively represented in FIG. 7 by a bus 712, for enabling electronic communications between system components. The system 700 may also include one or more communication link(s) 714 for enabling communication between system components (e.g., between AOADS 702 and flight control processor(s) 704, etc.). In various embodiments, communication link(s) 714 can include wired or wireless communication links (e.g., near field communication (NFC), Bluetooth™, etc.). A flight control processor 704, which may also be referred to as a central processing unit (CPU), can include any general or special-purpose processor capable of executing machine-readable instructions and performing operations on data as instructed by the machine-readable instructions. A memory element 706 may be directly accessible by the hardware processor for accessing machine-readable instructions and may be in the form of random access memory (RAM) or any type of dynamic storage (e.g., dynamic random-access memory (DRAM)). System 700 may also include non-volatile memory, such as a hard disk, that is capable of storing electronic data including executable software files. In some embodiments, externally stored electronic data may be provided to system 700 through one or more removable media drives, which may be configured to receive any type of external media such as compact discs (CDs), digital video discs (DVDs), flash drives, external hard drives, etc.

As used herein, the term "removable media drive" refers to a drive configured to receive any type of external computer-readable media. Instructions embodying activities, functions, operations, etc. described herein may be stored on one or more external and/or internal computer-readable media. Additionally, such instructions may also, or alternatively, reside at least partially within a memory element (e.g., in main memory or cache memory of processor(s) 704 during execution, or within a non-volatile memory element(s) (e.g., one or more memory element(s) 706) of system 700. Accordingly, other memory element(s) 706 of system 700 may also constitute computer-readable media. As referred to herein in this Specification, the term "computer-readable medium" is meant to include any non-transitory computer-readable storage medium (e.g., embedded logic provided in an application specific integrated circuit (ASIC), in digital signal processing (DSP) instructions, software [potentially inclusive of object code and source code], etc.) that is capable of storing instructions for execution by system 700 (e.g., by one or more flight control processor(s) 704) that causes the system to perform any of one or more of the activities, functions, operations, etc. disclosed herein.

In various embodiments, the at least one flight control processor 704 can execute instructions to perform operations for providing control signals to an actuator (such as actuators 514, 614) to control the chordwise position(s) of one or more vortex generators (e.g., vortex generators 506, 606) on the surface of an airfoil-shaped body (e.g., airfoil-shaped bodies 500, 600).

Figure 8:
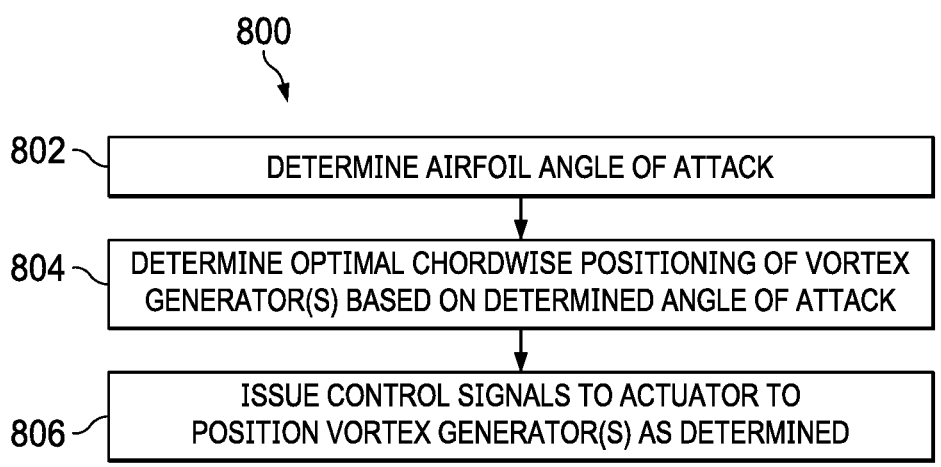
FIG. 8 is a simplified flowchart illustrating example details associated with a system for implementing variable chordwise vortex generators in accordance with certain embodiments.

Referring to FIG. 8, illustrated therein is a simplified flowchart 800 illustrating example details associated with a system for implementing variable chordwise vortex generators in accordance with certain embodiments. In at least one embodiment, the operations illustrated in FIG. 8 may be implemented by aircraft control system 700 illustrated in FIG. 7. In at least one embodiment, operation may begin at 802, in which an angle of attack of an airfoil-shaped body is determined, e.g., via dedicated sensors for sensing the angle of attack. In some embodiments, input(s) from display(s) and/or input system(s) may additionally be received at 802.

At 804, angle of attack information is processed to determine whether one or more vortex generators should be deployed and if so, an optimal chordwise position of the one or more vortex generators on a surface of an airfoil-shaped body with regard to the angle of attack. As previously noted, in some cases, it may be advantageous not to deploy a vortex generator at all. At 806, one or more control signals are provided to one or more actuators to cause the actuators to move the vortex generator(s) to the optimal position(s).

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure provide numerous technical advantages, including by way of example, maintaining performance at high angles of attack while increasing performance at low angles of attack.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus comprising:
an airfoil-shaped body; and
a chordwise variable vortex generation system associated with the airfoil-shaped body, the chordwise variable vortex generation system controlling a deployment of at least one vortex generator on a surface of the airfoil-shaped body, wherein the deployment of the at least one vortex generator is dependent on a current angle of attack of the airfoil-shaped body;
wherein the at least one vortex generator is configured to move closer to a leading edge of the airfoil-shaped body as the current angle of attack of the airfoil-shaped body increases and the at least one vortex generator is configured to move closer to a trailing edge of the airfoil-shaped body as the current angle of attack of the airfoil-shaped body decreases.

2. The apparatus of claim 1, wherein the chordwise variable vortex generation system comprises an actuator for controlling a location of the deployment of the at least one vortex generator responsive to a control signal indicative of the current angle of attack of the airfoil-shaped body.

3. The apparatus of claim 1, wherein the surface of the airfoil-shaped body comprises a top surface of the airfoil-shaped body.

4. The apparatus of claim 1, wherein the airfoil-shaped body is an aircraft wing.

5. The apparatus of claim 1, wherein the chordwise variable vortex generation system comprises a track disposed along the surface of the airfoil-shaped body between a leading edge of the airfoil-shaped body and a trailing edge of the airfoil-shaped body, the at least one vortex generator configured to move along the track from a first end of the track proximate the leading edge of the airfoil-shaped body to a second end of the track proximate the trailing edge of the airfoil-shaped body, and wherein a position of the at least one vortex generator along the track is dependent on the current angle of attack of the airfoil-shaped body.

6. The apparatus of claim 1, wherein the chordwise variable vortex generation system comprises a set of vortex generators disposed in a line along the surface of the airfoil-shaped body between a leading edge of the airfoil-shaped body and a trailing edge of the airfoil-shaped body, wherein only one vortex generator of the set of vortex generators is active and the remaining vortex generators of the set of the vortex generators are inactive.

7. The apparatus of claim 6, wherein the active vortex generator extends from the surface of the airfoil-shaped body and each inactive vortex generator lies flush with the surface of the airfoil-shaped body or is retracted within an interior of the airfoil-shaped body.

8. A rotorcraft comprising:
an airfoil-shaped body; and
a chordwise variable vortex generation system associated with the airfoil-shaped body, the chordwise variable vortex generation system controlling a deployment of at least one vortex generator on a surface of the airfoil-shaped body, wherein the deployment of the at least one vortex generator is dependent on a current angle of attack of the airfoil-shaped body;
wherein the at least one vortex generator is configured to move closer to a leading edge of the airfoil-shaped body as the angle of attack of the airfoil-shaped body increases and the at least one vortex generator is configured to move closer to a trailing edge of the airfoil-shaped body as the angle of attack of the airfoil-shaped body decreases.

9. The rotorcraft of claim 8, wherein the chordwise variable vortex generation system comprises an actuator for controlling a location of the deployment of the at least one vortex generator responsive to a control signal indicative of the current angle of attack of the airfoil-shaped body.

10. The rotorcraft of claim 8, wherein the surface of the airfoil-shaped body comprises a top surface of the airfoil-shaped body.

11. The rotorcraft of claim 8, wherein the airfoil-shaped body is a wing of the rotorcraft.

12. The rotorcraft of claim 8, wherein the chordwise variable vortex generation system comprises a track disposed along the surface of the airfoil-shaped body between a leading edge of the airfoil-shaped body and a trailing edge of the airfoil-shaped body, the at least one vortex generator configured to move along the track from a first end of the track proximate the leading edge of the airfoil-shaped body to a second end of the track proximate the trailing edge of the airfoil-shaped body, and wherein a position of the at least one vortex generator along the track is dependent on the current angle of attack of the airfoil-shaped body.

13. The rotorcraft of claim 8, wherein the chordwise variable vortex generation system comprises a set of vortex generators disposed in a line along the surface of the airfoil-shaped body between the leading edge of the airfoil-shaped body and the trailing edge of the airfoil-shaped body, wherein only one vortex generator of the set of vortex generators comprises an active vortex generator and the remaining vortex generators of the set of the vortex generators each comprise an inactive vortex generator.

14. The rotorcraft of claim 13, wherein the active vortex generator extends from the surface of the airfoil-shaped body and each inactive vortex generator lies flush with the surface of the airfoil-shaped body or is retracted within an interior of the airfoil-shaped body.

15. An apparatus comprising:
an airfoil-shaped body; and
a chordwise variable vortex generation system associated with the airfoil-shaped body, the chordwise variable vortex generation system controlling a deployment of at least one vortex generator on a surface of the airfoil-shaped body, wherein the deployment of the at least one vortex generator is dependent on a current angle of attack of the airfoil-shaped body;
wherein the chordwise variable vortex generation system comprises a set of vortex generators disposed in a line along the surface of the airfoil-shaped body between a leading edge of the airfoil-shaped body and a trailing edge of the airfoil-shaped body, wherein only one vortex generator of the set of vortex generators comprises an active vortex generator and the remaining vortex generators of the set of the vortex generators each comprise an inactive vortex generator; and
wherein the active vortex generator is configured to extend from the surface of the airfoil-shaped body and each inactive vortex generator is configured to lie flush with the surface of the airfoil-shaped body or be retracted within an interior of the airfoil-shaped body.

16. The apparatus of claim 15, wherein the chordwise variable vortex generation system comprises an actuator for controlling a location of the deployment of the at least one vortex generator responsive to a control signal indicative of the current angle of attack of the airfoil-shaped body.

17. The apparatus of claim 15, wherein the airfoil-shaped body is a wing of a rotorcraft.

18. The apparatus of claim 15, wherein a vortex generator of the set of vortex generators closer to the leading edge of the airfoil-shaped body comprises the active vortex generator as the current angle of attack of the airfoil-shaped body increases and another vortex generator of the set of vortex generators closer to the trailing edge of the airfoil-shaped body comprises the active vortex generator as the current angle of attack of the airfoil-shaped body decreases.

* * * * *